United States Patent
Huber

(10) Patent No.: US 8,130,802 B2
(45) Date of Patent: Mar. 6, 2012

(54) TUNABLE LASER

(75) Inventor: Robert Alexander Huber, Schnaitsee (DE)

(73) Assignee: Ludwig-Maximilians-Universitaet Muenchen, Munich (DE)

( * ) Notice: Subject to any disclaimer, the term of this patent is extended or adjusted under 35 U.S.C. 154(b) by 0 days.

(21) Appl. No.: 12/612,472

(22) Filed: Nov. 4, 2009

(65) Prior Publication Data

US 2010/0103964 A1  Apr. 29, 2010

Related U.S. Application Data

(63) Continuation of application No. PCT/DE2008/000766, filed on May 5, 2008.

(30) Foreign Application Priority Data

May 7, 2007 (DE) .......................... 10 2007 021 313

(51) Int. Cl.
*H01S 3/10* (2006.01)

(52) U.S. Cl. .................. 372/20; 372/6; 372/18; 372/28; 372/97; 372/98; 359/337.11; 359/337.2; 359/341.1; 359/346; 359/347

(58) Field of Classification Search .................. 372/20, 372/97, 98, 6, 18, 28; 359/337.2, 337.11, 359/341.1, 346, 347
See application file for complete search history.

(56) References Cited

U.S. PATENT DOCUMENTS

| 5,513,196 A | * | 4/1996 | Bischel et al. .................. 372/22 |
| 6,529,328 B1 | * | 3/2003 | Cheng et al. .................. 359/578 |
| 6,833,946 B2 | * | 12/2004 | Islam ............................ 359/334 |
| 6,901,087 B1 | | 5/2005 | Richardson et al. |
| 2006/0187537 A1 | * | 8/2006 | Huber et al. ............. 359/337.22 |
| 2007/0071040 A1 | * | 3/2007 | Flanders et al. ................. 372/20 |

FOREIGN PATENT DOCUMENTS

| EP | 0 524 382 B1 | 1/1993 |
| GB | 2 317 045 A | 3/1998 |
| WO | WO 03/096106 A1 | 11/2003 |
| WO | WO 2006/079078 A2 | 7/2006 |

OTHER PUBLICATIONS

Telle, J. M., et al., "Very Rapid Tuning of CW Dye Laser", Applied Physics Letters, May 15, 1975, pp. 572-574, vol. 26, No. 10, American Institute of Physics.

Huang, D., et al., "Optical Coherence Tomography". Reports, Science Magazine, Nov. 22, 1991, pp. 1178-1181, vol. 254.

Hee, M. R., et al., "Optical Coherence Tomography of the Human Retina", Clinical Sciences, 1995, pp. 325-332, vol. 113, No. 3. Archives of Ophthalmology.

Tearney, G. J., "In Vivo Endoscopic Optical Biopsy with Optical Coherence Tomography", Reports, Science Magazine, Jun. 27, 1997, pp. 2037-2039, vol. 276.

(Continued)

*Primary Examiner* — Yuanda Zhang
(74) *Attorney, Agent, or Firm* — Slater & Matsil, L.L.P.

(57) ABSTRACT

A tunable laser includes an optical gain medium, a first resonator, a periodically tunable optical filter, and a second resonator in which light of a laser wavelength exhibits a round trip time T. The optical filter is arranged between the first resonator and the second resonator and is tuned with a period t. The period t is governed by t=(n/m) T, where n and m are integers and m/n is not an integer.

19 Claims, 13 Drawing Sheets

OTHER PUBLICATIONS

Huber, R., et al., "Fourier Domain Mode Locked Lasers for OCT Imaging at up to 290 kHz Sweep Rates", Proceedings of SPIE-OSA Biomedical Optics, Jan. 1, 2005, pp. 1-6, vol. 5861, SPIE.

Huber, R., et al., "Amplified, Frequency Swept Lasers for Frequency Domain Reflectometry and OCT Imaging: Design and Scaling Principles", Optics Express, May 2, 2005, pp. 3513-3528, vol. 13, No. 9.

Huber, R., et al., "Fourier Domain Mode Locking (FDML): A New Laser Operating Regime and Applications for Optical Coherence Tomography", Optics Express, Apr. 17, 2006, pp. 3225-3237, vol. 14, No. 8.

Lee, E. C. W., et al., "In vivo Optical Frequency Domain Imaging of Human Retina and Choroid", Optics Express, May 15, 2006, pp. 4403-4411, vol. 14, No. 10.

Huber, R., et al., "Fourier Domain Mode Locked (FDML) Lasers at 1050 nm and 202,000 Sweeps per Second for OCT Retinal Imaging", Proceedings of SPIE, 2007, pp. 1-7, vol. 6429, SPIE.

Adler., D. C., et al., "Phase Sensitive Optical Coherence Tomography Using Buffered Fourier Domain Mode Locked Lasers at up to 370,000 Scans Per Second", Proceedings of SPIE, 2007, pp. 1-9, vol. 6429, SPIE.

\* cited by examiner

TUNABLE LASER

This application is a continuation of co-pending International Application No. PCT/DE2008/000766, filed May 5, 2008, which designated the United States and was not published in English, and which claims priority to German Application No. 10 2007 021 313.3 filed May 7, 2007, both of which applications are incorporated herein by reference.

TECHNICAL FIELD

The invention relates to a tunable laser. For example, a compact, extremely rapidly tunable, narrowband laser is disclosed.

BACKGROUND

Conventional rapidly tunable lasers usually contain a laser medium that amplifies over a wide range of wavelengths, and a tunable optical bandpass filter. When the frequency to which the optical bandpass filter is tuned is increased, it can occur that the laser activity stops, because the light in the resonator can no longer perform enough round trips to develop saturated laser activity before the optical bandpass filter is tuned to a new wavelength. This problem can only be solved to a limited degree by using resonators of shorter length, since shorter resonator lengths increase the laser's mode spacing and give rise to increased noise.

In order to overcome this problem, document WO 2006/079078 A3 discloses the concept of spectral mode locking, or "Fourier Domain Mode Locking" (FDML). In accordance with this concept, the optical filter is tuned synchronously with the round trip time of the light in the resonator. This means that light of a specific wavelength hits the optical filter again after one round trip in the resonator when the optical filter is again tuned to this particular wavelength. FDML lasers have the advantage over conventional rapidly tunable lasers that there is no fundamental restriction on the tuning speed, and that they have a narrower line width and a greater coherence length. They also offer lower noise and greater power than conventional rapidly tunable lasers, and do not generally have a discrete mode structure.

One disadvantage of known FDML lasers, however, is that the synchronization of the round trip time in the resonator with the filtered tuning time requires the use of a very long optical delay line. A very long glass fiber is usually used as the delay line. If the optical filter is, for instance, tuned at a frequency of 30 kHz, the glass fiber must be 7 km in length in order to match the round trip time in the delay line to the filter's tuning frequency. Relatively high costs are incurred by the use of such long glass fibers. In addition, the long glass fiber means that this kind of FDML laser is relatively large.

SUMMARY

In one aspect, the invention provides an improved tunable laser that is characterized in that it is relatively compact and can be manufactured economically.

A tunable laser according to one embodiment of the invention comprises an optical gain medium, a first resonator and a periodically tunable optical filter, wherein the laser contains a second resonator in which light of a laser wavelength exhibits a round trip time T, the optical filter is arranged between the first resonator and the second resonator and is tuned with a period t governed by $t=(n/m) T$, where n and m are integers and m/n is not an integer.

The first resonator preferably contains the optical gain medium. The first resonator does not necessarily have to be a laser resonator in the classic sense, but preferably the laser light passes through it only once. Instead of the very long optical delay line used in conventional FDML lasers, the laser comprises, in addition to the first resonator, a second resonator through which the light passes multiple times. To achieve multiple round trips in the second resonator, the optical frequency is synchronized at a frequency that corresponds to a subharmonic, thus, a fraction of the round trip frequency of the light through the second resonator. In particular, the round trip time $T=(m/n) t$ does not equal an integral multiple of the period t with which the optical filter is tuned. As a result of this, light of a particular wavelength that passes through the second resonator is not transmitted the next time it hits the filter, because at that moment the filter is tuned to a different wavelength. Rather, the optical filter is tuned to that specific wavelength again only after n round trips of the light through the second resonator.

The number of round trips made by the light in the second resonator is preferably given by $n \geq 2$, particularly preferably by $n \geq 10$, in particular, by $n \geq 100$.

In addition to the advantages of conventional FDML lasers, the laser has the advantage, in particular, that the length of fiber used can be shorter by a factor n, where n is the number of round trips made in the second resonator. For example, if the number of round trips in the second resonator is given by a number, $n=100$, the glass fiber used for the second resonator can be 100 times shorter than in a conventional FDML laser. The laser can therefore have a much more compact design, and, in particular, is more economical in the case of the special polarization-maintaining fibers that are preferably employed.

It is, moreover, advantageous that the optical filter can be tuned to smaller frequency intervals than can be done with a conventional FDML laser. When compared with conventional FDML lasers, the tuning frequency can be advantageously adjusted in small steps, for instance, in 1% steps in the case of 100 round trips of the second resonator.

For instance, a conventional FDML laser with a 7 km glass fiber can be operated at a frequency of 30 kHz or harmonics thereof, that is at 60 kHz, 90 kHz, 120 kHz and so on. In contrast to this, a laser according to the invention in which 100 round trips of the resonator occur, can be operated at, for instance, frequencies of 30 kHz, 30.3 kHz, 30.6 kHz and so on.

The laser's optical gain medium is preferably contained in the first resonator. The second resonator on the other hand is advantageously a passive resonator. During the periodic tuning of the optical filter, in each case specific wavelengths that are within the respectively adjusted transmission range of the filter are transmitted out of the first resonator into the second resonator and back. Those wavelengths that are not transmitted by the filter are preferably almost fully reflected back by the filter into the second resonator. For this reason it is advantageous if the absorption of the filter is negligibly small. The optical filter can be, in particular, a tunable Fabry-Perot filter.

The optical filter is implemented in the form of a Fabry-Perot filter in at least one embodiment of the laser. Such filters can be tuned efficiently, and exhibit high-quality.

According to at least one embodiment of the laser the optical filter can be blocked, at least temporarily, during a tuning period t independently of the frequency. This is realized in at least one embodiment of the laser in that the filter can be moved perpendicularly to a transmission direction.

According to at least one embodiment of the laser, the second resonator comprises at least one element that effects a rotation of the polarization. This element is preferably constructed with a Faraday mirror or with a Sagnac type fiber mirror.

According to at least one embodiment of the laser, it comprises at least one polarization-selective gain medium in the first resonator. The polarization of the amplified radiation can be set effectively by a gain medium of this type.

According to at least one embodiment of the laser, the radiation can be coupled out of the second resonator. This allows the output coupling frequency to be adjusted over a wide range.

According to at least one embodiment of the laser it comprises at least one post-amplifier. Post-amplification of the radiation coupled out of the first or second resonator can achieve high optical power of the laser.

According to at least one embodiment of the laser the first resonator comprises at least one polarization-maintaining fiber. The polarization state of the light can be maintained by means of such a fiber.

The invention is not restricted by the description that refers to the exemplary embodiments. Rather, the invention comprises each new feature, as well as any combination of features, which includes, in particular, any combination of features in the patent claims, even if this feature or this combination is not itself explicitly specified in the patent claims or exemplary embodiments.

BRIEF DESCRIPTION OF THE DRAWINGS

The invention is explained in the following in more detail on the basis of FIGS. 1 to 13.

Elements in the figures that are either identical, or have the same effect as one another, are given the same reference numbers.

DETAILED DESCRIPTION OF ILLUSTRATIVE EMBODIMENTS

Figure 1:
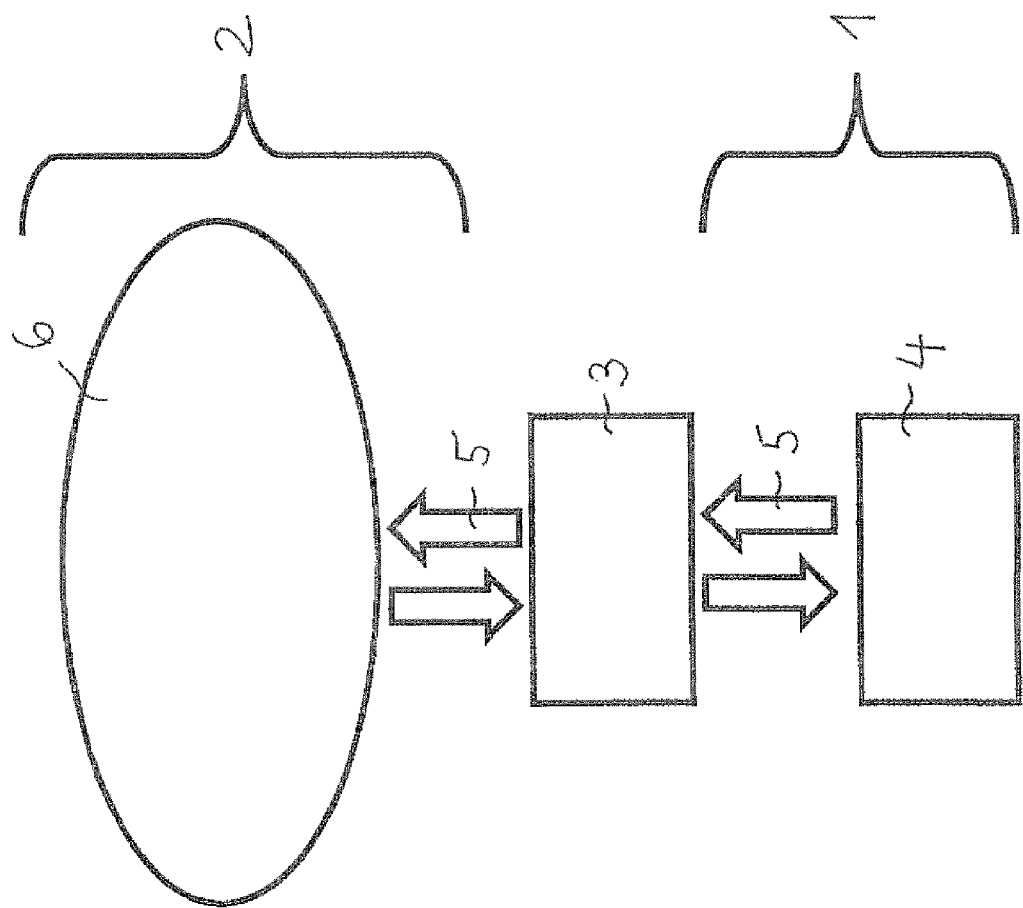
FIGS. 1 to 13 each show schematic representations of exemplary embodiments of a tunable laser according to the invention.

The exemplary embodiment of a tunable laser shown in FIG. 1 contains a first resonator 1 that comprises an optical gain medium 4. The laser furthermore contains a second resonator 2, which is preferably a passive resonator, i.e., a resonator with no optical gain medium. A wavelength-selective optical filter 3 that is arranged between the first resonator 1 and the second resonator 2 is tuned periodically, and as a result is transparent in each case to a specific range of wavelengths at a specific time, allowing these wavelengths to pass from the first resonator into the second resonator, as is indicated by the arrows 5. The second resonator 2 operates as an optical buffer 6 in which the light circulates until, after n round trips, the filter 3 is again tuned so that it is transparent to this specific wavelength. The light requires a time T to make a complete round trip in the second resonator 2.

The filter 3 is tuned to a period t that satisfies the condition $t=(n/m) T$, where n and m are non-zero integers. The value of m/n is not an integer, and therefore the round trip time $T=(m/n) t$ in the second resonator 2 does not correspond to an integral multiple of the period t of the optical filter. After a specific wavelength has been transmitted through the filter 3, the filter is therefore not transparent again following just one round trip through the second resonator 2, but only after a number n round trips. In contrast to an optical delay line known in conventional FDML lasers, the light passes multiple times through the second resonator 2, wherein the number of round trips n only has an upper limit set by the optical losses occurring during a large number of round trips. The first resonator 1 that contains the optically active medium 4 should be short enough for light to be able to complete a full round trip in the first resonator 1 during the time in which the optical filter 3 is transparent to a specific wavelength. After one round trip in the first resonator 1, which is short in comparison to the second resonator 2, the filter 3 is thus detuned only slightly if at all. It is possible for light to be transmitted in two slightly different states of the filter 3 if the filter is not tuned in steps. This configuration therefore does not provide perfect synchronization between the round trip time in the first resonator 1 and the period t with which the filter 3 is tuned.

Figure 2:
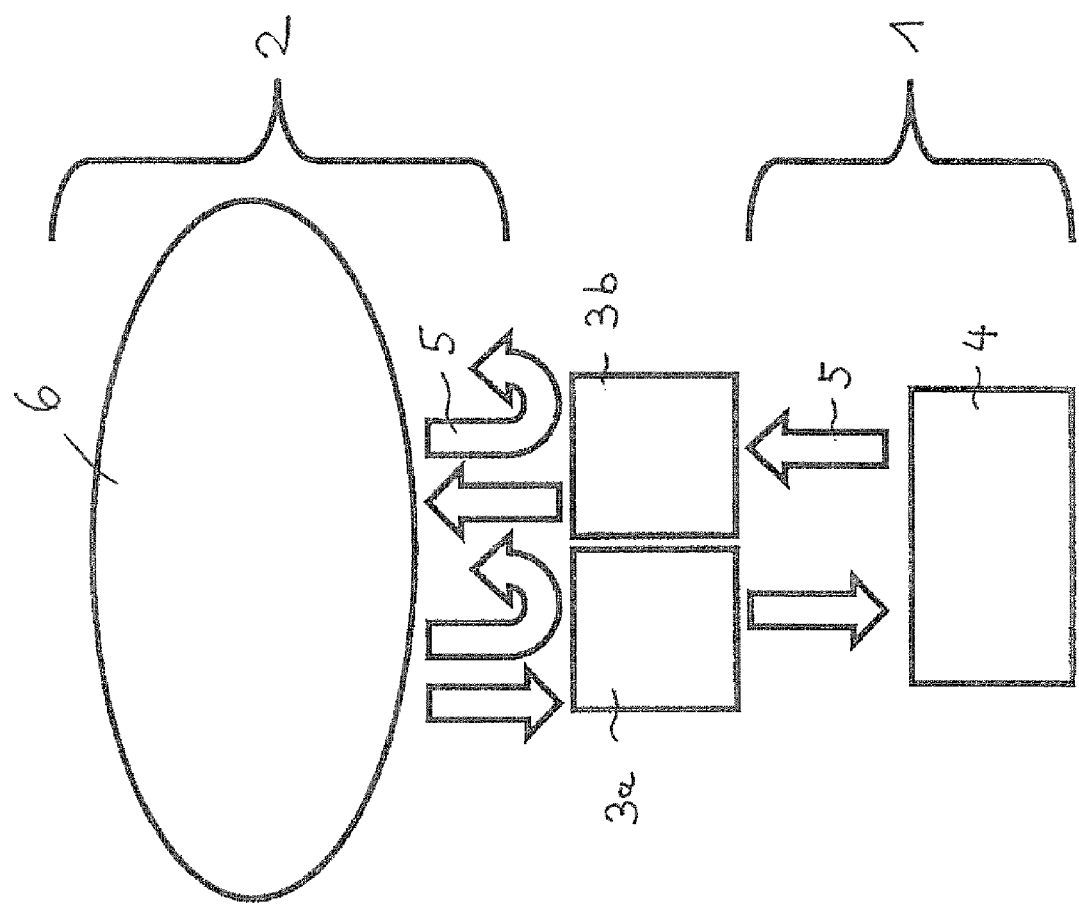

A construction with two or more filters 3 can be used to achieve better synchronization. FIG. 2 schematically illustrates an exemplary embodiment of the laser according to the invention in which light is coupled in and out of the first resonator 1 and into the second resonator 2 and vice versa not by a single filter, but rather by two filters 3a, 3b. In this embodiment, light can be coupled out of the second resonator 2 acting as an optical buffer 6 through a first filter 3a into the first resonator 1, which contains the optical amplifier 4. Following one round trip through the first resonator 1, the light is coupled back into the second resonator 2 through the second filter 3b. Following one round trip time for the light through the first resonator 1, the second filter 3b is tuned to the wavelength that was previously transmitted by the first filter 3a. Perfect synchronization, like that of an FDML laser, can be achieved in this way. In contrast to conventional laser resonators, the light only passes once through the first resonator 1.

Figure 3:
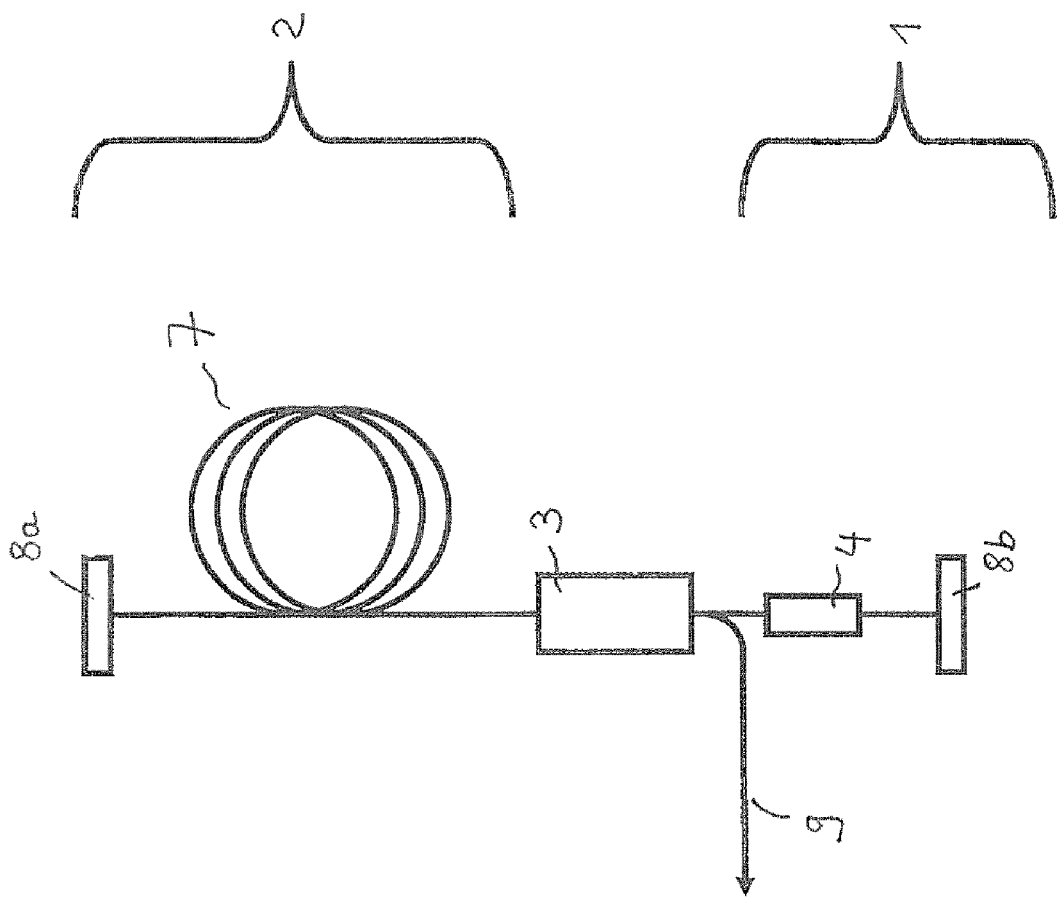

In the exemplary embodiment illustrated in FIG. 3, the second resonator 2 comprises an optical fiber 7. The fiber 7 is preferably a single-mode fiber. In particular, the fiber 7 can be a polarization-maintaining fiber in order to prevent changes to the polarization state and to avoid instabilities. In the case of standard single-mode fibers, additional polarization controllers can be used in order to set a desired polarization. At one side the second resonator 2 is terminated by a first mirror 8a which can be, for instance, a fiber Bragg grating, a metal mirror or a dielectric mirror, a Sagnac type fiber mirror, or a Faraday mirror. At the other side the second resonator 2 is terminated by a tunable fiber Fabry-Perot filter 3 (FFP-TF—"Fiber Fabry Perot Tunable Filter") or an acousto-optical, tunable fiber Bragg grating filter. When an FFP-TF filter 3 is employed, the plano-concave type is preferably used, wherein the plane side faces towards the fiber 7. This increases the intensity that is reflected back into the fiber. Losses would otherwise occur if the concave surface was oriented in the direction of the fiber 7. Preferably therefore a filter 3 is used with which the light that is not transmitted is reflected fully back into the second resonator. The filter 3 is preferably operated by means of an essentially periodic electronic waveform with low phase and amplitude noise (less than 80 dB as a rule). Feedback loops can be used here to stabilize the frequency in respect of the resonator length and in that way to compensate for thermally dependent variations.

The first resonator 1 is terminated by the tunable filter 3 and by a further mirror 8b. In the first resonator 1, a proportion of the light that has been amplified in it is coupled out, as is indicated in FIG. 3 by the arrow 9. The optical amplifier 4 comprised by the first resonator 1 can, for instance, be a semiconductor optical amplifier (SOA). Alternatively, fiber amplifiers doped with rare earths or non-linear gain media can also be used.

The frequency with which the optical filter 3 is modulated corresponds to a subharmonic of the round trip frequency in the second resonator 2. The possible tuned frequencies of the optical filter 3 with an optical path length of 300 m in the second resonator 2 can, for instance, be 500 kHz, 250 kHz, 166.66 kHz, 125 kHz etc., or can also be 1 MHz, 1.5 MHz and so on. After n round trips the light is coupled out of the second resonator 2 into the first resonator 1, amplified in the first resonator 1, and coupled back into the second resonator 2. After another n round trips, the light is again transmitted by the filter 3 and amplified again. The filter 3 preferably exhibits high transmission in the transmission range, preferably of more than 50%, and thus a low level of return reflection.

Figure 4:
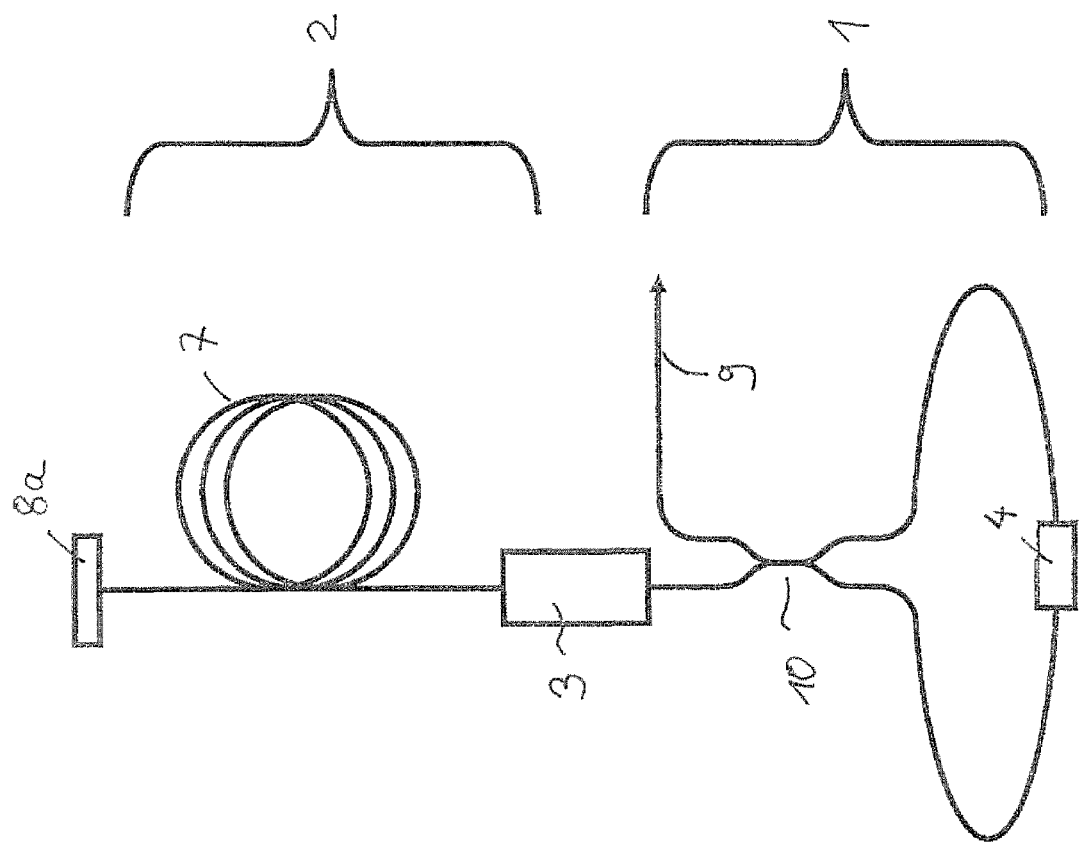

FIG. 4 illustrates a modification of the exemplary embodiment illustrated in FIG. 3, in which an optical coupler 10 is arranged within the first resonator 1, through which a portion of the laser radiation is coupled out of the first resonator 1, as is indicated by the arrow 9.

Figure 5:
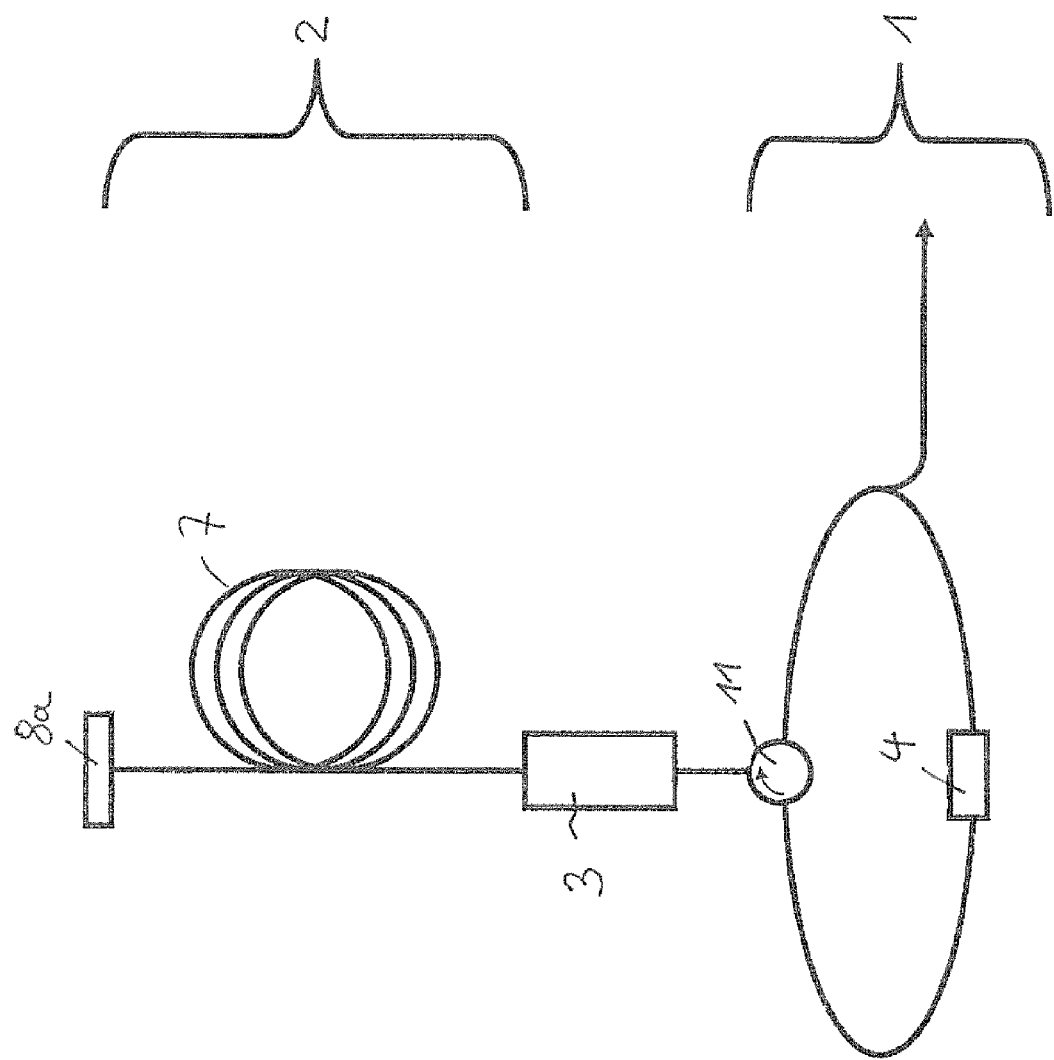

In the exemplary embodiment illustrated in FIG. 5, the first resonator 1 contains an optical circulator 11. The circulator 11 acts as an optical switch, by means of which the ring-like part of the first resonator 1 is connected to the filter 3.

Figure 6:
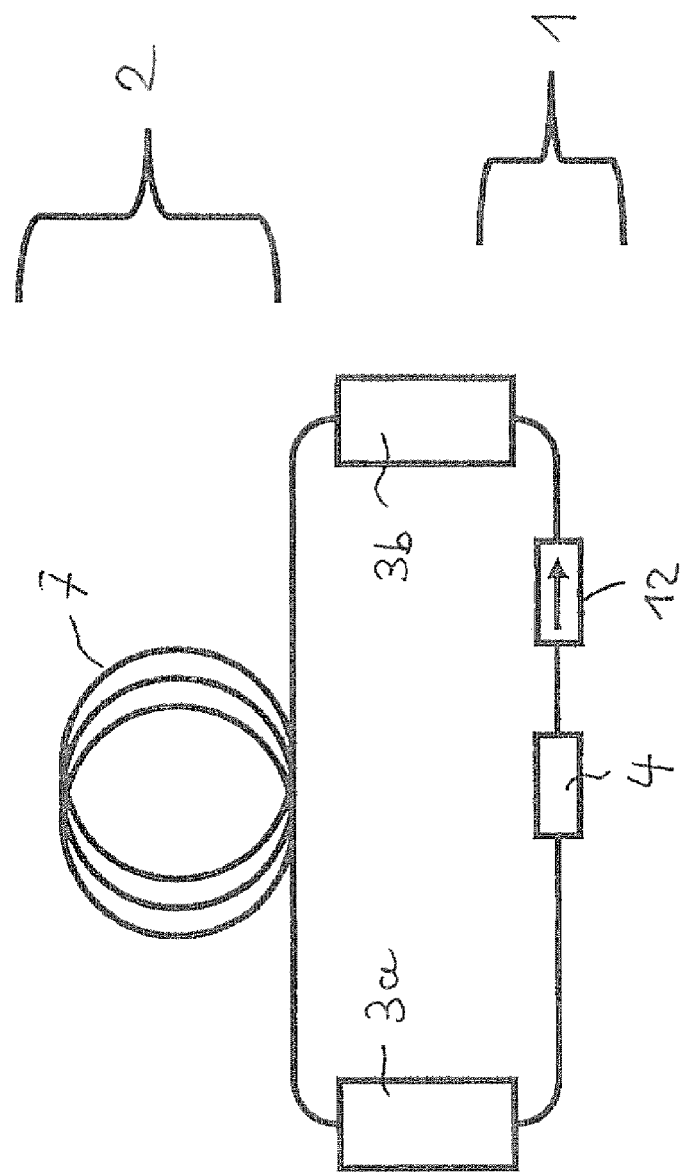

FIG. 6 schematically illustrates an exemplary embodiment of a tunable laser, in which the second resonator 2 comprises a filter 3a, 3b respectively at each end, in particular, a Fabry-Perot filter, through which the second resonator 2 is coupled to the first resonator 1. In this embodiment, the filters 3a, 3b can be synchronized in such a way that they each exhibit a transmission maximum after one round trip through the first resonator 1. This embodiment has the advantage that it avoids a time shifted double transit of the light, when coupling in and out of the first resonator 1. The first resonator 1 contains an optical isolator 12 that is only transparent in the direction indicated by the arrow. A further isolator (not illustrated) can be provided in the first resonator 1, wherein the isolators are preferably arranged at both sides of the optical gain medium 4.

Figure 7:
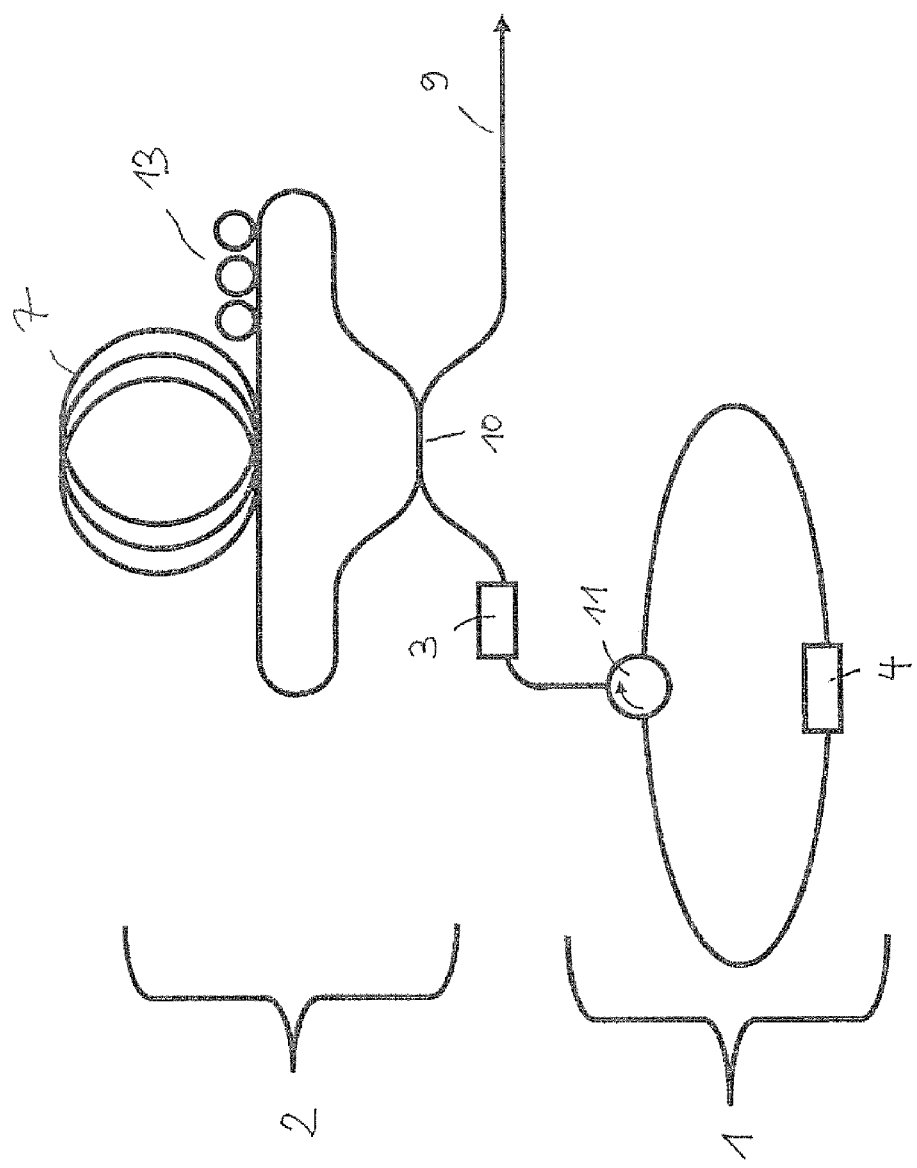

FIG. 7 illustrates a bidirectional implementation for improved stabilization of the polarization. The second resonator 2 contains a polarization controller 13.

As a result of the multiple passes through the second resonator 2, the effect of a polarization controller 13 or of a dispersion compensator is multiplied.

Figure 8:
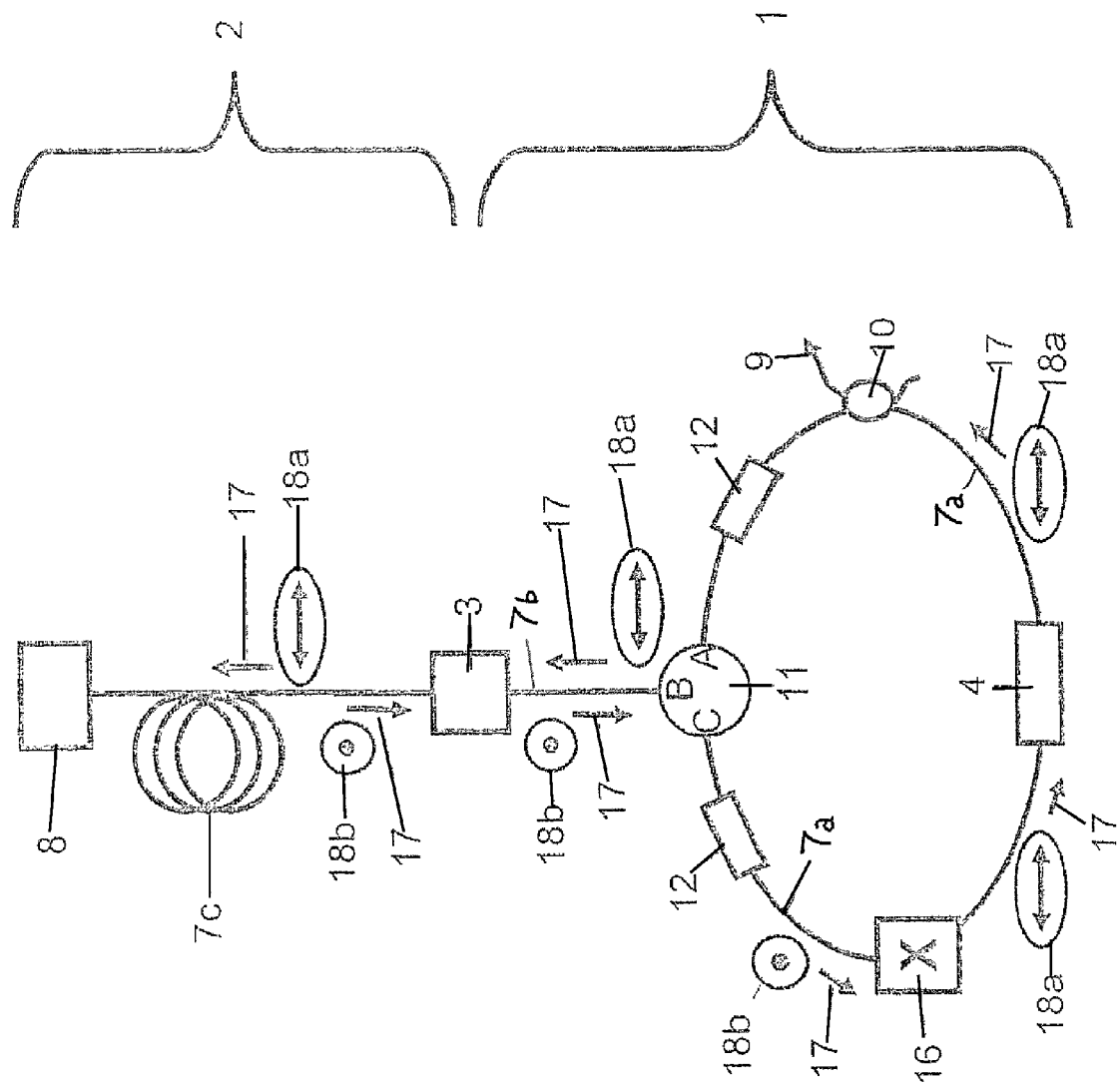

FIG. 8 schematically illustrates a further exemplary embodiment. The first resonator 1, configured as a ring resonator with a polarization-maintaining fiber 7a, comprises a polarization-dependent amplifying gain medium 4. A semiconductor optical amplifier (SOA) can, for instance, be used as the gain medium 4. The gain medium 4 is built in such a way that it only amplifies light with one direction of polarization; in the exemplary embodiment according to FIG. 8, this is, for instance, light with a polarization direction 18a, horizontal with respect to the plane of the drawing, symbolized by double arrows. Light whose direction of polarization is perpendicular to the plane of the drawings 18b is indicated by dots. The direction of travel of the light is indicated by arrows 17.

An optical circulator 11 is located between the ring-like first resonator 1 and the filter 3, which is implemented as a fiber Fabry-Perot filter. The circulator 11 here guides light from connector A to connector B. Light that enters through connector B emerges from connector C, while light that hits connector C is not transmitted onwards. The circulator 11 thus acts as an optical isolator for light from the direction towards connector C. The circulator 11 has no significant effect on the direction of polarization of the light.

Between connector C of the circulator 11 and the optical gain medium 4 there is a 90° splice 16 that joins two ends of the polarization-maintaining fiber 7a in such a way that the ends are rotated by 90° with respect to one another. This means that when passing through the 90° splice 16, the polarization direction 18a, 18b of the light is rotated by 90° with respect to the plane of the drawing. The first resonator 1 also comprises an optical coupler 10 to couple out the radiation 9.

A polarization-maintaining fiber 7b is also attached to connector B of the circulator 11, whose second end is connected to the filter 3. A first side of the filter 3 facing towards the circulator 11 exhibits a lower reflectivity than a second side of the filter 3 that faces towards the second resonator 2. The reflectivity of the first side is preferably less than 60%, particularly preferably less than 50%. The reflectivity of the second side is preferably more than 90%, particularly preferably more than 95%.

The passive second resonator 2 is thus terminated at one side by the highly reflective second side of the filter 3, and at the other side by a mirror 8 in the form of a Faraday mirror. The mirror 8 turns the polarization direction 18a, 18b of the reflected light by 90° with respect to the incident light. Filter 3 and mirror 8 are connected to each other by a fiber 7c. The fiber is a single mode fiber or a polarization-maintaining fiber.

Lasers with a wide spectral bandwidth, in particular, exhibit the effect whereby light whose frequency is at the edge of the amplification range of the gain medium 4 is amplified only relatively weakly in comparison with frequencies in the center of the amplification range. This means that if light with frequencies in the center and light with frequencies at the edge of the amplification range of a laser resonator are both present, amplification is provided almost exclusively to the light whose frequencies are in the center. This effect can result in reducing the width of the frequency range of a laser.

In order to prevent this effect in the case of a subharmonic FDML laser, the laser can be constructed as illustrated in FIG. 8. The manner of operation will be explained in more detail in the following. Because the amplification provided by the amplifier 4 is selective for polarization, the light generated by the amplifier 4 has a specific direction of polarization 18a, for instance, parallel to the plane of the drawing. This generated light reaches the circulator 11, passes from connector A to connector B, and then reaches filter 3. There are now two possibilities: (A) the tunable filter 3 is transmitting for the wavelength of the light at the moment the light arrives, or (B) the filter 3 blocks the light, which means that a portion of the light is lost while a further portion is reflected back in the direction of connector B of circulator 11, and then passes through connector C back to the ring-like part of the first resonator 1.

In case (A), the light remains in the second resonator 2 until the filter 3 is again transmitting for the corresponding wavelength and the light is coupled into the first resonator 1. If the light in the second resonator 2 is travelling towards the mirror 8, then it has, for instance, a direction of polarization 18a parallel to the plane of the drawing. If the light now hits the Faraday mirror 8 it is reflected, in the process its direction of polarization is turned by 90°, with the result that the direction of polarization 18b is then perpendicular to the plane of the drawing. Because the filter 3 does not have any polarizing effect, the light is reflected with no change in the direction of polarization, and travels back towards the mirror 8, where the direction of polarization is again turned by 90° by the reflection.

The filter 3 is therefore to be tuned with a period t in such a way that the light in the first resonator 1 is coupled into the second resonator 2 after an odd number of round trips, for instance after 15 round trips. When entering the first resonator 1, this light therefore has a direction of polarization 18b that is rotated by 90° with respect to the light emerging from the first resonator 1.

The light that is coupled in passes from connector B to connector C of the circulator 11, and reaches the 90° splice 16, whereby the direction of polarization 18b of the light is again turned by 90°. After passing through the 90° splice 16, the polarization direction 18a of the light is thus again parallel to the plane of the drawing. The light therefore reaches the gain medium 4 with the correct direction of polarization 18a, and is thus amplified by it.

In case (B) the filter 3 blocks the light generated by the gain medium 4; this means that the light is reflected back by filter 3 towards the circulator 11, wherein its direction of polarization 18a is maintained. This means that the light in the exemplary embodiment according to FIG. 8 is then polarized parallel to the plane of the drawing. The circulator 11 passes the light to the 90° splice 16, and this rotates the polarization of the light into a direction 18b, perpendicular to the plane of the drawing, as a result of which this light cannot be amplified by the gain medium 4. Thus the gain medium 4 can only amplify light that has made a complete pass through the second resonator 2 at least once. Thus only light wavelengths synchronous with the tuning period t of the filter 3 are amplified, and the amplification of other wavelengths is suppressed. The amplification bandwidth is not significantly narrowed.

Light with wavelengths that are asynchronous to the tuning period t of the filter 3 and that passes, for instance, twice through the first resonator 1, thereby undergoing two rotations of its polarization in the 90° splice 16, and therefore again having a direction of polarization 18a, which would be amplified by the gain medium 4, is also reflected twice by the filter 3. Since, when blocking, the filter 3 only exhibits a relatively low reflectivity in the direction of circulator 11, this light is also effectively suppressed, and amplification of this light is prevented.

Optionally the first resonator 1 comprises optical isolators 12 which can be based on the Faraday effect and only allow light to pass in one direction 17. The gain medium 4 can, alternatively, also be implemented as a gain medium that is independent of polarization, but in this case must be combined with a polarizer.

Figure 9:
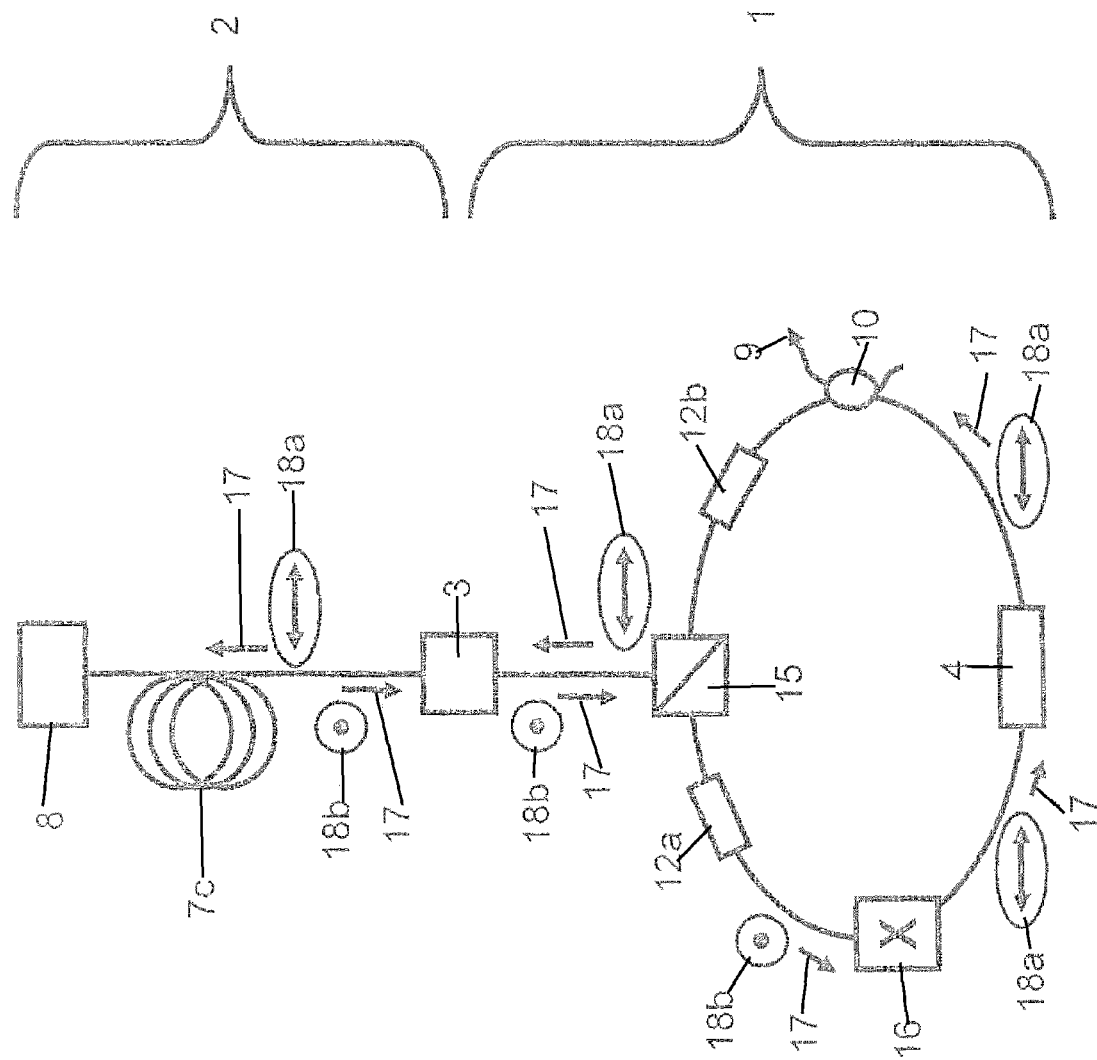

The exemplary embodiment according to FIG. 9 corresponds largely to that illustrated FIG. 8. Instead of the circulator 11, however, a polarizing reflecting beam splitter 15 (abbreviated to PBS) is used. Light that, for instance, has a direction of polarization 18a parallel to the plane of the drawing and that reaches the beam splitter 15 is reflected towards the filter 3. Light that is blocked by filter 3 is reflected back by filter 3 towards the beam splitter 15, wherein its direction of polarization 18a is maintained. The beam splitter 15 then reflects such light back along the same path as the incoming light towards the gain medium 4, and it is blocked by the optical isolator 12a.

Light that is reflected by the beam splitter 15, transmitted by filter 3, and then makes an odd number of round trips in the second resonator 2 has a direction of polarization rotated by 90°, and therefore, after leaving the second resonator 2, is transmitted by the beam splitter 15, undergoes a rotation of the direction of polarization 18a, 18b by 90° in the 90° splice 16, and can be amplified. Through the combination of the beam splitter 15 with polarization dependent reflection and the optical isolator 12a, light whose wavelength is asynchronous to the period t of the filter 3 can also be effectively suppressed if the first side of the filter 3 has a high reflectivity for such light. A second isolator 12b can optionally be located in the first resonator 1.

Figure 10:
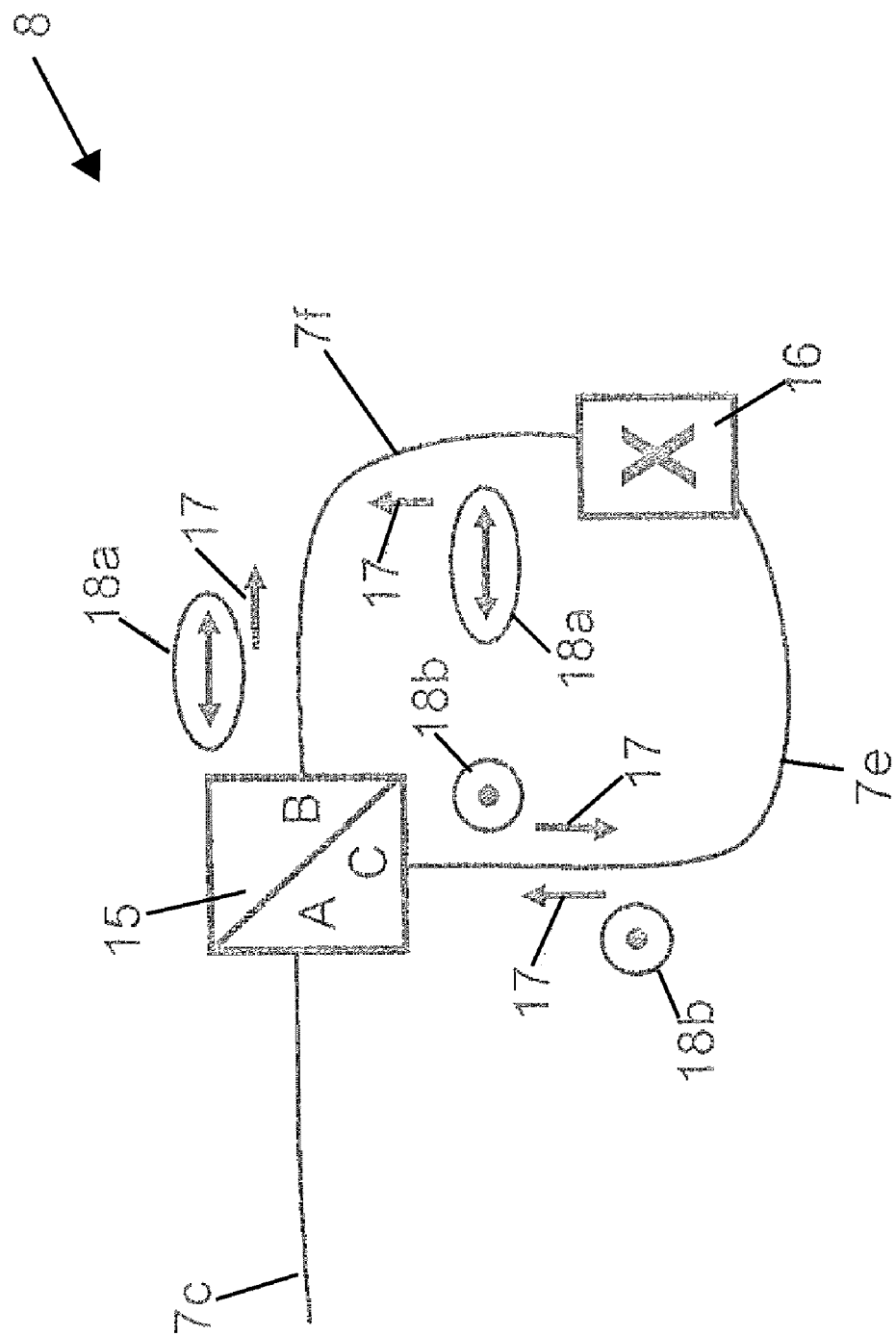

FIG. 10 schematically illustrates a Sagnac type of fiber mirror. A Sagnac type of fiber mirror can be employed as an alternative to a Faraday mirror as the polarization-rotating mirror 8. Light from the fiber 7c, which can be implemented as a single-mode fiber or as a polarization-maintaining fiber, reaches a connector A of a beam splitter 15 with polarization dependent reflection. Light with a polarization direction 18a parallel to the plane of the drawing is transmitted by the beam splitter 15 in the direction of the connector B, while light with a direction of polarization 18b perpendicular to the plane of the drawing is reflected in the direction of connector C. Terminals B and C of the beam splitter 15 are connected together by polarization-maintaining fibers 7e, 7f, wherein the fibers 7e, 7f are connected together by a 90° splice 16. The direction of polarization 18a of the light that comes from connector B of the beam splitter 15 and travels towards connector C is rotated by 90° by this 90° splice 16. Since the direction of polarization 18b is then perpendicular to the plane of the drawing, the light from beam splitter 15 is reflected back through connector A into the fiber 7c. Similar considerations apply to light that travels from connector C of the beam splitter 15 to connector B. An arrangement of this type can thus rotate the direction of polarization of the light passing through the arrangement by 90°. The difference between the lengths of the fibers 7e, 7f is preferably less than what is called the beat length, and particularly preferably shorter than half the beat length. In particular, the difference in length between fibers 7e and 7f is less than 4 mm.

Figure 11:
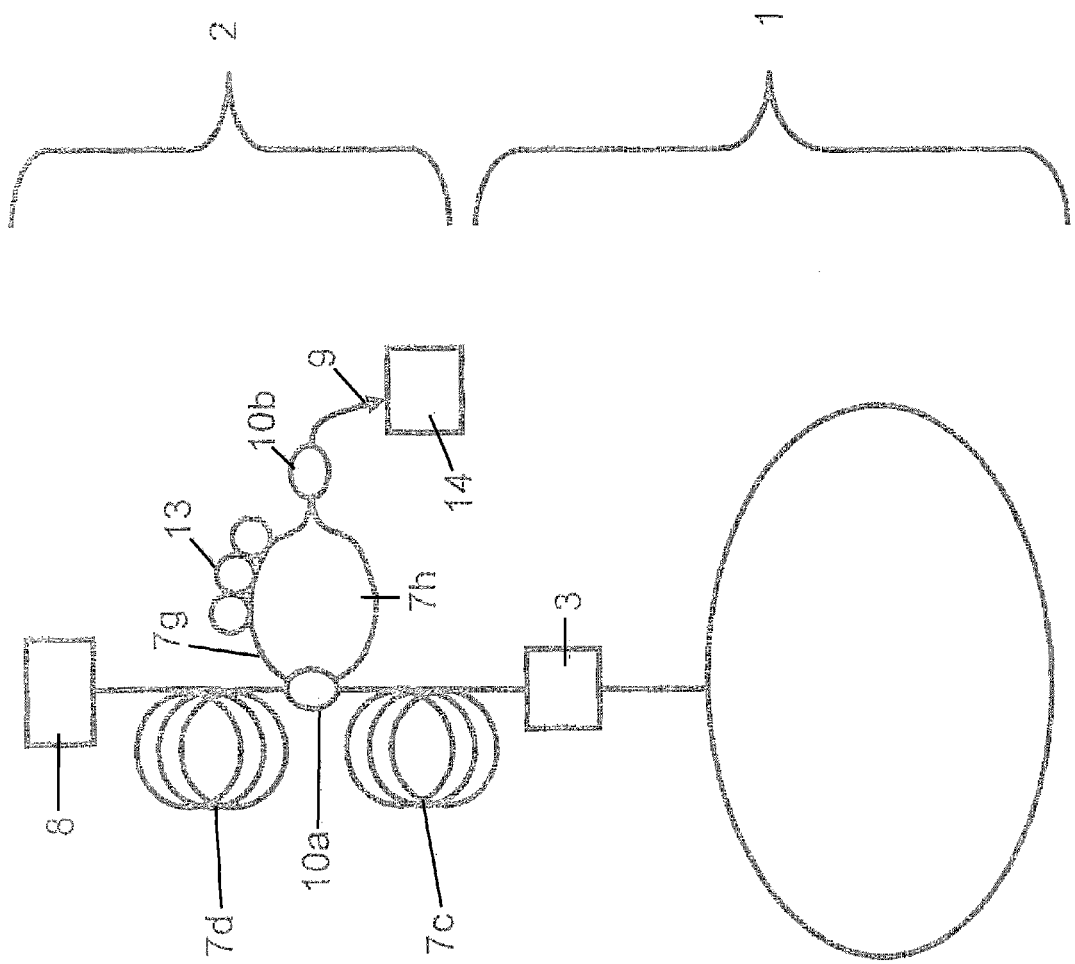

FIG. 11 schematically illustrates an exemplary embodiment in which the radiation 9 in the second resonator 2 is coupled out. The first resonator is built, for instance, according to FIG. 9 or FIG. 10. An optical coupler 10a, by which light is coupled out of the second resonator 2, is attached between the two fibers 7c, 7d, which are preferably implemented as polarization-maintaining or as single-mode fibers. The fibers 7c and 7d are preferably similar in length, and particularly preferably are identical in length. Two fibers 7g, 7h are attached to the coupler 10a. Light that travels in the second resonator 2 from the filter 3 towards the mirror 8 is coupled into the fiber 7g, while light that travels in the second resonator 2 from the mirror 8 towards filter 3 is coupled into the fiber 7h. The polarization controller 13 can adjust the direction of polarization of the light in the fiber 7g in such a way that the direction of polarization corresponds to that of the light in the fiber 7h. A further fiber coupler 10b can combine the light from both fibers 7g, 7h.

As an alternative to a second coupler 10b, a beam splitter with polarization dependent reflection can be used in an arrangement similar to that illustrated in FIG. 10 in order to combine the two partial beams from the fibers 7g, 7h. In this case the polarization controller 13 is also not needed. The radiation 9 that is coupled out can, however, have different directions of polarization at different moments, which can be desirable in some applications.

A further option consists in using a polarization-independent 50% beam splitter in place of the polarization controller 13 and/or polarization dependent beam splitter or coupler 10b. In this case, however, the coupling losses from combining the partial beams from the fibers 7g and 7h are relatively high.

The radiation 9 coupled out in this way can then optionally, depending on requirements, either be guided to a measuring station, or can be further amplified using, for instance, an active amplifying fiber or an optical semiconductor amplifier 14.

The exemplary embodiments such as those of FIG. 7 and FIG. 11 can also be combined.

Figure 12:
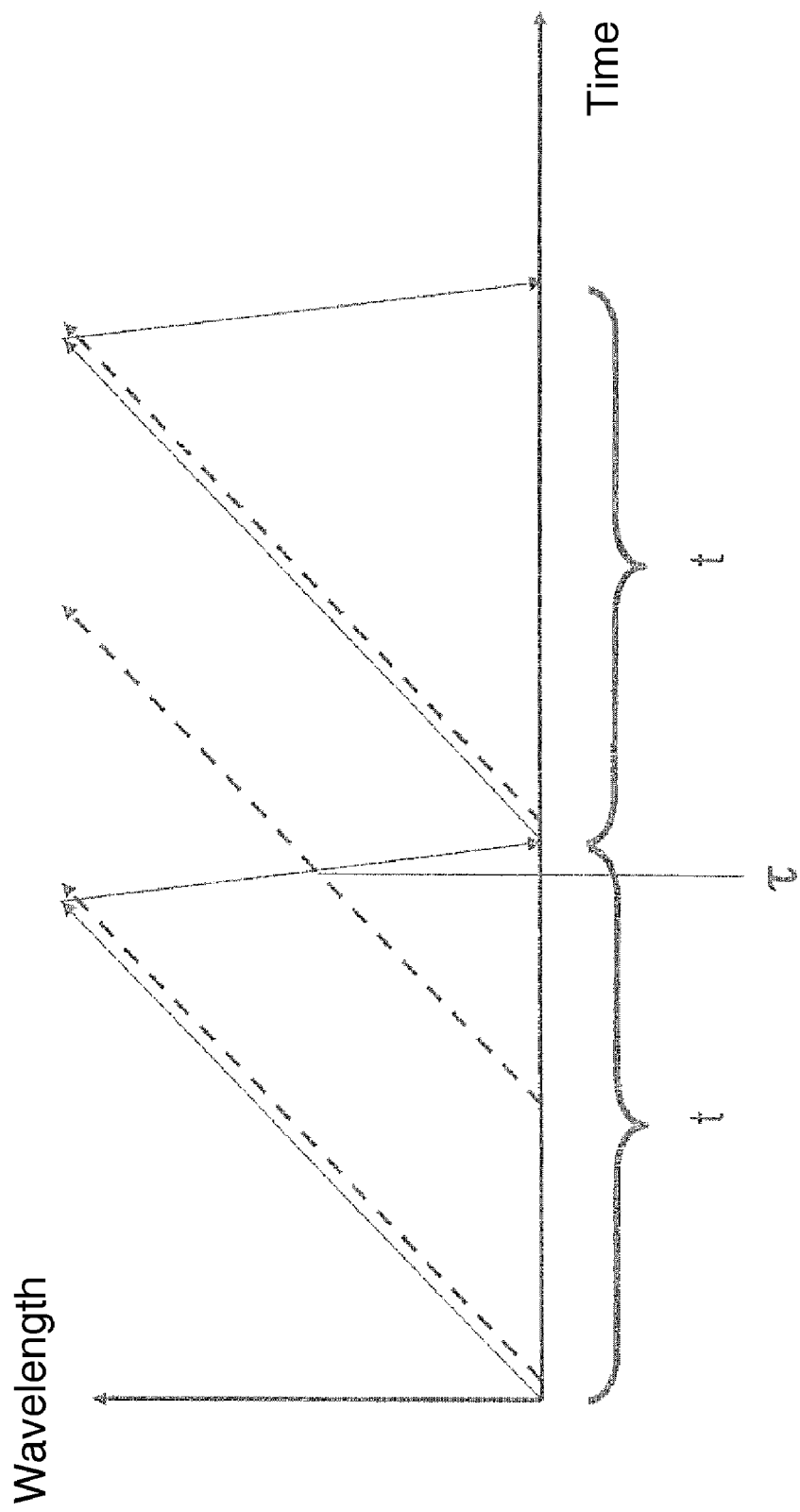

A further problem that can occur in a subharmonic FDML laser is illustrated in FIG. 12. The transmission wavelength of the filter 3 and the wavelength of the light incident on filter 3 are plotted here against time. The transmission wavelength of the filter 3 is drawn as a continuous line, while the wavelength of the light that is incident on the filter 3 is shown as a dotted line. The filter 3 is operated, for example, with a sawtooth voltage. The two edges of the sawtooth voltage preferably have different slopes so that the return of filter 3 to its initial state is faster than the sweep through the transmission wavelength. As the filter 3 returns to its initial state, it is possible for it to have a transmission wavelength at which during the return light is transmitted through the filter 3 into the first resonator 1. In FIG. 12 this occurs at time τ. This can lead to unwanted power variations of the FDML laser. The effect can, for instance, be avoided by appropriately adapting the length of the second resonator 2 and the tuning period t of the filter 3 to each other.

Figure 13:
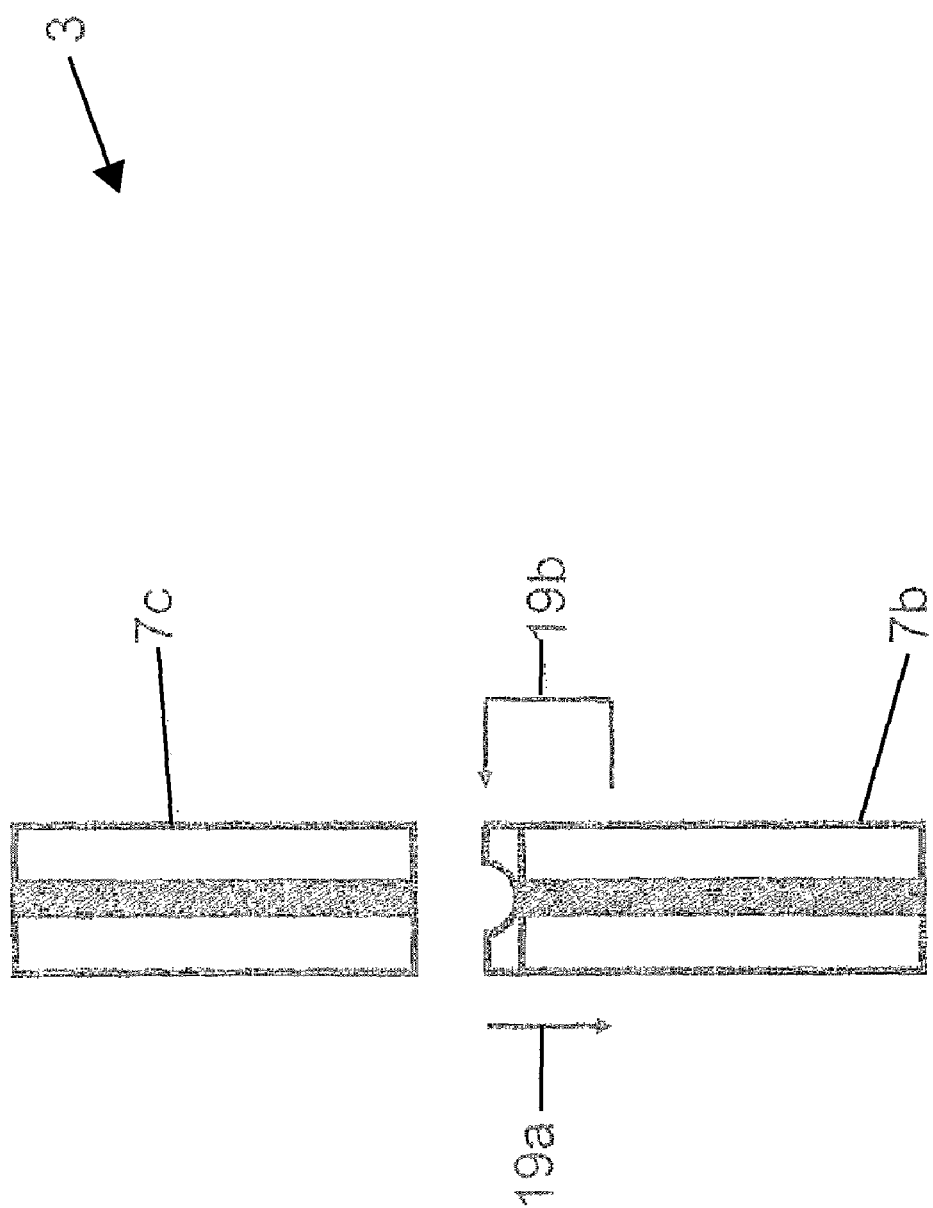

An alternative possibility is for the filter 3 to act non-transmitting during times when the transmission of light through filter 3 is unwanted. FIG. 13 schematically illustrates one way of realizing this. For instance, the part of the fiber 7c that belongs to the second resonator 2, which forms the second side of the filter 3, is mechanically fixed. The first side of the filter 3 that is joined to the fiber 7b is movably mounted. In addition to the longitudinal movement 19a in the transmission direction responsible for tuning the frequency of the fiber Fabry-Perot filter 3, an additional movement 19b occurs with a component perpendicular to the direction of transmission of the filter 3. This means that the filter 3, or the end of the fiber 7b, is temporarily displaced in such a way that the quality of the Fabry-Perot is reduced, and light cannot pass from fiber 7b into fiber 7c or the other way. Movement of this sort of the first side of the filter 3 or of the fiber 7b in two, or even three, dimensions can, for instance, be realized by a piezoelectric actuator.

What is claimed is:

1. A tunable laser comprising:
   an optical gain medium;
   a first resonator comprising the optical gain medium;
   a second resonator in which light of a laser wavelength exhibits a round trip time T; and
   a periodically tunable optical filter arranged between the first resonator and the second resonator and is tuned with a period t;
   wherein the period t is governed by:

$t=(n/m)T,$ where n and m are non-zero integers and m/n is not an integer; and
   wherein the light makes multiple round trips in the second resonator during the period t.

2. The tunable laser according to claim 1, wherein n≧2.
3. The tunable laser according to claim 2, wherein n≧10.
4. The tunable laser according to claim 3, wherein n≧100.
5. The tunable laser according to claim 1, wherein the second resonator is a passive resonator.
6. The tunable laser according to claim 1, wherein the second resonator comprises at least one optical fiber.
7. The tunable laser according to claim 1, wherein the optical filter is a tunable fiber Fabry-Perot filter.
8. The tunable laser according to claim 1, wherein the optical filter, during a period t, can temporarily be blocked independently of frequency.
9. The tunable laser according to claim 8, wherein the optical filter is movable perpendicular to a transmission direction.
10. The tunable laser according to claim 1, wherein the second resonator comprises at least one element that rotates polarization.
11. The tunable laser according to claim 10, wherein the at least one element that rotates polarization comprises a Faraday mirror.
12. The tunable laser according to claim 10, wherein the at least one element that rotates polarization comprises a Sagnac type of fiber minor.
13. The tunable laser according to claim 1, wherein the first resonator comprises at least one polarization-selective gain medium.
14. The tunable laser according to claim 1, wherein radiation can be coupled out of the second resonator.
15. The tunable laser according to claim 1, further comprising at least one post-amplifier.
16. The tunable laser according to claim 1, wherein the first resonator comprises at least one polarization-maintaining fiber.
17. The tunable laser according to claim 1,
   wherein a first part of the optical filter is movable perpendicular to a transmission direction, and
   wherein a second part of the optical filter is not movable.
18. A tunable laser comprising:
   an optical gain medium;
   a first resonator comprising the optical gain medium;
   a second resonator in which light of a laser wavelength exhibits a round trip time T; and
   a periodically tunable optical filter arranged between the first resonator and the second resonator and is tuned with a period t, wherein the period t is governed by:

$t=(n/m)T,$ where n and m are non-zero integers and m/n is not an integer, and
   wherein during the period t the light arriving from the second resonator at the filter is at least once not transmitted into the first resonator.
19. The tunable laser according to claim 18,
   wherein during the period t the light arriving from the second resonator at the filter is at least once reflected back into the second resonator.

* * * * *